UNITED STATES PATENT OFFICE.

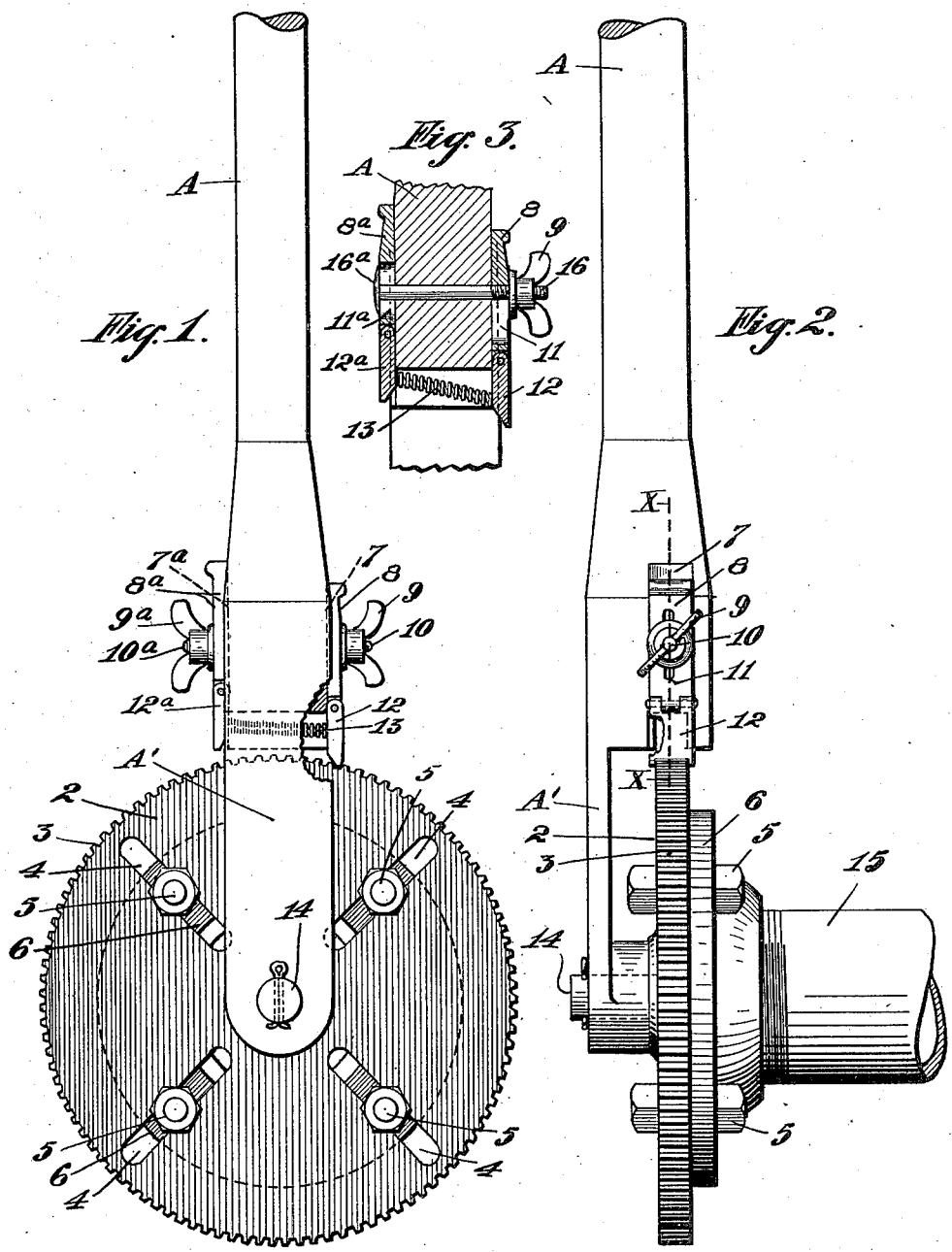

WILLIAM PILFIELD SWENEY, OF SAN FRANCISCO, CALIFORNIA.

FLANGE-SETTING TOOL.

1,011,092.  Specification of Letters Patent.  Patented Dec. 5, 1911.

Application filed June 20, 1911. Serial No. 634,223.

*To all whom it may concern:*

Be it known that I, WILLIAM P. SWENEY, citizen of the United States, residing in the city and county of San Francisco and State of California, have invented new and useful Improvements in Flange-Setting Tools, of which the following is a specification.

This invention relates to a flange setting tool.

It is the object of this invention to provide a tool for setting threaded flanges on threaded pipes and for removing them therefrom.

Another object is to provide a tool of the above character which is simple in construction, strong and durable, and which has few parts and is not liable to get out of order.

The invention consists of the parts and the construction and combination of parts, as hereinafter more fully described and claimed, having reference to the accompanying drawings, in which—

Figure 1 is a side elevation with parts broken away. Fig. 2 is an end elevation showing the invention as applied. Fig. 3 is a vertical section on the line X—X, Fig. 1, showing a modified form of the adjustable pawls.

In the drawings, A represents a handle or shank for the tool, one end of which has an extension A' on which a disk 2 is revolubly mounted. The periphery of the disk 2 is provided with square ratchet teeth 3 which are adapted to be engaged by pawls on the shank A, as will presently be described, in such manner that the disk 2 will be rotated by oscillating the shank A. A series of radially disposed slots 4 are formed on the disk 2, through which bolts 5 are adapted to extend. These bolts 5 pass through perforations formed in a flange 6, which is the ordinary pipe flange of commerce, in such manner as to rigidly secure the flange 6 to the face of the disk 2, as shown in Fig. 2. Grooves 7—7ª are formed on the sides of the shank A which parallel the axis of the disk 2 and extend longitudinally of the shank. Slidable blocks 8—8ª are mounted in the grooves 7—7ª and are adapted to be clamped to the shank A at various positions by means of wing nuts 9—9ª which are screwed on threaded pins 10—10ª mounted on the shank A, and extending through slots 11—11ª formed in the blocks 8—8ª. The lower ends of the blocks 8—8ª have pawls 12—12ª pivotally mounted thereon, which pawls are adapted to engage the ratchet teeth 3 on the periphery of the disk 2. The pawls 12—12ª are connected together by means of a helical spring 13, which spring normally retains the pawls 12 in their innermost position close to the shank or handle A. The spring 13 is disposed in a slot formed in the shank A, which slot is narrower than the pawls 12—12ª, so as to form abutments against which the pawls 12—12ª are normally held by the spring 13. The abutments thus formed limit the backward movement of the pawls 12—12ª.

The pivot pin 14 on which the disk 2 is supported is mounted upon the extension A' on the end of the shank A; the disk 2 being disposed a sufficient distance from the face of the extension A' to permit the heads of the bolts 5, which project beyond the face of the disk 2, to pass from one side to the other of the shank A.

When it is desired to screw a flange 6 upon a pipe 15, the flange 6 is secured to the face of the disk 2 by means of the bolts 5. The pawl 12, which is free to move in the direction opposite that necessary to turn the flange 6 in order to screw the latter on the pipe 15, is then thrown into engagement with the teeth 3 on the periphery of the disk 2, as shown in Fig. 1. This is accomplished by adjusting the block 8 in the groove 7 and clamping it against movement by screwing the wing nut 9 on the stem 10. The pawl 12ª on the opposite side of the shank A is then removed clear of the teeth 3 by adjusting the block 8ª in the slot 7ª and retaining it securely against movement by tightening the wing nut 9ª on the threaded stud 10ª. This being done, the flange 6 is then placed on the threaded end of the pipe 15. The shank A on being oscillated by the operator causes the pawl 12ª, in engagement with the teeth 3, to ride over the teeth when the shank A is moved in one direction, and to engage the teeth 3 when the shank A is moved in the opposite direction. By moving the shank A in the direction required to screw the flange 6 into position, the pawl 12 engages the teeth 3 on the disk 2, so as to cause the latter to revolve the distance traversed by the shank A, which action rotates the flange 6 and screws it into position on the pipe 15. On small pipes around which there is sufficient room the shank A may be rotated in complete revolutions, thus turning the flange 6 continuously; otherwise, when the pipe 15 is large or is disposed in a crowded position, the shank A is operated in short oscillating strokes, thus giving the disk 2 and flange 6 thereon successive intermittent movements. When it is desired to unscrew the flange 6 and remove it from the pipe 15, the relative positions of the pawls 12—12$^a$ are reversed; the pawl 12$^a$ being thrown into engagement with the teeth 3 and the pawl 12 being withdrawn clear thereof, so that when the shank A is operated, it will act to turn the disk 2 and flange 6 in the direction necessary to unscrew the flange 6 from the pipe 15, and opposite that just described.

While I have shown four slots 4 in the disk 2 arranged at right angles to each other, it is obvious that as many more or less may be employed as desired; these slots being arranged to correspond to the number of bolt holes formed in flanges 6, which are stock flanges now generally in use, and in which the bolt holes vary in number and arrangement according to the diameter of the flanges.

If desired, but one wing nut 9 may be employed, as shown in Fig. 3; in this event the wing nut is screwed on a bolt 16 which passes through the shank A and the slots 11—11$^a$ in the blocks 8—8$^a$; the head 16$^a$ of the bolt 16 retaining the block 8$^a$ in position on the shank A. By this arrangement both the blocks 8 and 8$^a$ may be loosened or tightened by one operation.

Having thus described my invention, what I claim and desire to secure by Letters Patent is—

1. A flange setting tool comprising an apertured shank, a disk revolubly mounted on said shank, said disk having ratchet teeth formed on the periphery thereof, a pair of pawls mounted on said shank, means for adjusting said pawls to dispose one pawl in engagement with the ratchet teeth on the disk and to dispose the other pawl out of engagement therewith, said means comprising slotted pawl carrying members slidable with respect to the shank and a clamping member extending through the slots of the said pawl-carrying members and through the aperture in the shank and means for attaching said disk to a flange.

2. A flange setting tool comprising a shank, a disk revolubly mounted on said shank, said disk having ratchet teeth formed on the periphery thereof, a pair of blocks slidably mounted on opposite sides of said shank, guides formed on the shank in which said blocks are mounted, a pawl mounted on each of said blocks and adapted to be thrown in or out of engagement with the ratchet teeth on the disk, by adjusting said blocks on the shank, means for locking the blocks against movement, and means for attaching the disk to a flange.

3. A flange setting tool comprising a shank, a disk revolubly mounted on said shank, said disk having ratchet teeth formed on the periphery thereof, a pair of blocks slidably mounted on opposite sides of said shank, guides formed on the shank in which said blocks are mounted, a pawl mounted on each of said blocks and adapted to be thrown in or out of engagement with the ratchet teeth on the disk, by adjusting said blocks on the shank, yieldable means connecting the pawls for normally retaining them in an innermost position, means formed on the shank for limiting the movement of pawls in one direction, means for locking the blocks against movement, and means for attaching the disk to a flange.

In testimony whereof I have hereunto set my hand in the presence of two subscribing witnesses.

WILLIAM PILFIELD SWENEY.

Witnesses:
JOHN H. HERRING,
CHARLES EDELMAN.

---

Copies of this patent may be obtained for five cents each, by addressing the "Commissioner of Patents, Washington, D. C."